US006233679B1

(12) United States Patent
Holmberg

(10) Patent No.: US 6,233,679 B1
(45) Date of Patent: May 15, 2001

(54) METHOD AND SYSTEM FOR BRANCH PREDICTION

(75) Inventor: Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/370,169

(22) Filed: Aug. 9, 1999

Related U.S. Application Data

(63) Continuation of application No. PCT/SE98/00190, filed on Feb. 3, 1998.

(30) Foreign Application Priority Data

Feb. 12, 1997 (SE) .................................................... 9700475

(51) Int. Cl.[7] .................................................... G06F 9/32
(52) U.S. Cl. .................................................... 712/240
(58) Field of Search .................................................... 712/240

(56) References Cited

U.S. PATENT DOCUMENTS

| | | | |
|---|---|---|---|
| 4,334,268 | 6/1982 | Boney et al. | 712/234 |
| 5,051,944 | 9/1991 | Fetterrolf et al. | 714/47 |
| 5,367,703 | 11/1994 | Levitan | 712/23 |
| 5,394,529 | 2/1995 | Brown, III et al. | 712/240 |
| 5,423,011 | 6/1995 | Blaner et al. | |
| 5,440,704 | 8/1995 | Itomitsu et al. | 712/239 |
| 5,742,804 * | 4/1998 | Yeh et al. | 712/237 |
| 5,835,745 * | 11/1998 | Sagar et al. | 712/215 |
| 5,857,104 * | 1/1999 | Natarjan et al. | 712/5 |
| 5,887,159 * | 3/1999 | Burrows | 712/226 |
| 5,890,008 * | 3/1999 | Panwar et al. | 712/15 |
| 5,933,628 * | 8/1999 | Chang | 712/237 |

OTHER PUBLICATIONS

*SIGPLAN Notice*, vol. 29, No. 11, 1994, Cliff Young et al., "Improving the Accuracy of Static Branch Prediction Using Branch Correlation".
*SIGPLAN Notice*, vol. 27, No. 9, 1992 Shien–Tai Pan et al., "Improving the Accuracy of Dynamic Branch Prediction Using Branch Correlation".
*Computer Architecture News*, vol. 24, No. 2, 1996, (Philadelphia, Pennyslvania, USA), Nicolas Gloy et al., "An Analysis of Dynamic Branch Prediction Schemes on System Workloads".

* cited by examiner

*Primary Examiner*—David Y. Eng
(74) *Attorney, Agent, or Firm*—Nixon & Vanderhye P.C.

(57) ABSTRACT

In a computer a system for branch prediction is arranged. The branch prediction system uses a scanning mechanism (303) for scanning the program memory for conditional branch instructions during the running of the program. When finding such an instruction the system records during a preset time interval (311) the statistics for that specific conditional branch instruction and sets a branch prediction but in the instruction accordingly (321). The system then starts to scan for the next conditional branch instruction in the program memory. The system can also be used for updating a BHT during the running of a program. The use of the system is particularly useful in applications when a program is run for a relatively long time such as a program used in a telephone switch. The use of the system also allows for changing branch predictions during the run of a program.

18 Claims, 4 Drawing Sheets

METHOD AND SYSTEM FOR BRANCH PREDICTION

This is a continuation of PCT application No. PCT/SE98/00190, filed Feb. 3, 1998, the entire content of which is hereby incorporated by reference in this application.

TECHNICAL FIELD

The present invention relates to a method and system for branch prediction in a computer system. The method and the system are particularly well suited for use in processors executing programs running for a long time such as the ones used in telecommunication systems.

BACKGROUND OF THE INVENTION AND PRIOR

Branch prediction mechanisms can be loosely divided into static branch prediction and dynamic branch prediction mechanisms.

Static branch prediction is implemented by including a prediction within the branch instruction, i.e. a bit that gives an indication to the processor executing the conditional branch instruction whether a conditional branch is likely to be taken or not. This bit is set by the compiler based on either heuristics, i.e. a conditional branch out of loops is most often not taken, or based on feedback from program execution. The feedback from execution is collected by means of having a program inserting instructions around each conditional branch which records whether the branch is taken or not. The program is then executed and statistics are collected. Thereupon, the program is compiled once again and the collected branch statistics is used to set branch prediction.

Dynamic branch prediction collects branch statistics in separate data structures in the processor, for example in branch history tables, BHTs, or in separate bits in the processor instruction cache or memory. Usually one or two bits in an instruction cache line are used.

The disadvantage with these methods are:

Setting static branch prediction based on heuristics does not give optimal performance.

Setting static branch prediction based on feedback gives a number of extra steps in the program generation and works well only as long as the branch statistics collected are similar to real execution in systems using varying and different data sets.

Dynamic branch prediction adds cost for additional data structures within the CPU. Due to physical limitations, as well as costs, these structures can not include data for all conditional branch instructions in the program and several data branches have to share entries within a BHT. The performance of dynamic branch prediction then depends on the statistical behaviour of the program. For example, if the lower bits of the address of the conditional branch instruction are used to select an entry in the BHT, the performance can depend on whether or not the program has been loaded on addresses that make more than one often executed branch.

In telecommunication applications, programs are loaded into the system and will be used continuously for a long time, i.e. usually at least for weeks, until the system is reloaded with a new revision of the program. The execution can in most cases be expected to have the same statistics during that time.

Furthermore, U.S. Pat. No. 5,367,703 describes a branch prediction mechanism in a superscalar processor system. The mechanism uses branch history tables which include a separate branch history for each fetch position within a multi-instruction access. A prediction field consisting of two bits is used for determining whether a particular branch is to be taken or not. The value of the two bits is incremented or decremented in response to a branch being taken or not.

U.S. Pat. No. 5,423,011 discloses an apparatus consisting of an associated memory in which branch prediction bits are stored, cache lines and comparison means for matching stored prediction bits with their corresponding cache lines.

In the patent application GB 2 283 595 a branch prediction circuitry which can operate in one of the two user selectable modes is described.

SUMMARY

It is an object of the present invention to provide a method and a system which overcomes the problems as outlined above, and which can provide a branch prediction mechanisms which can take advantage of the fact that a program is run for a long time.

This object is obtained with a semi-static branch prediction mechanism comprising three parts:

1) a branch prediction bit in the instruction, or an extra bit in the instruction memory,
2) a hardware counter that can collect branch statistics for a specific conditional branch instruction in the program memory, and
3) a background program.

The branch prediction mechanism then operates as follows: The background program, e.g. a program having a low priority, a periodic recurrent program, etc., reads the instruction memory to locate conditional branch instructions.

When finding a conditional branch instruction the background program starts the hardware counter to record branch statistics for that branch and goes to sleep for a while.

After waking up, the background program uses the collected statistics to set the prediction in the conditional branch instruction in the program memory.

A system operating in such a manner has several advantages, such as:

It is transparent for software, and even if the instruction in the program memory is used for storing branch prediction information, there is no impact on any software development tools and the way of storing information can be changed between CPU implementations.

The hardware design is simple.

The hardware cost is low, since no separate data structures are needed for branch prediction.

The method makes it possible to predict multiple conditional branch instructions in parallel, which for example can be needed in superscalar processors for getting good branch prediction accuracy.

The program performance depends on the execution statistics for the predicted branch only, not on interaction with other conditional branch instructions in other programs.

However, there are some conditions that must be met for the semi-static branch prediction mechanism to work well, i.e. to provide a good branch prediction.

i) The sample program must be executed for a relatively long time and have approximately the same behaviour during that time since it takes some time for the background program to scan the program for all conditional branch instructions, and collect reliable statistics.

ii) It must be possible to include the branch prediction bit.

iii) It must be possible to include a hardware counter or counters for collecting execution statistics.

The APZ processors used in the AXE telephone switch manufactured by Ericsson fulfil all these requirements. The hardware and software are custom designed and most conditional branch instructions have several unused bits, which can be used for storing branch prediction.

Furthermore, the background program and the counters can be used for updating a branch history table (BHT). Instead of updating the prediction bit in a conditional branch instruction after each time new statistics are collected, the background program is used for updating the prediction field corresponding to the instruction in the BHT.

Such an implementation can, for example, be advantageous when it is not possible to include the branch prediction bit.

BRIEF DESCRIPTION OF THE DRAWINGS

The present invention will not be described in more detail by way of non-limiting examples and with reference to the accompanying drawings, in which.

DESCRIPTION OF PREFERRED EMBODIMENTS

Figure 1:
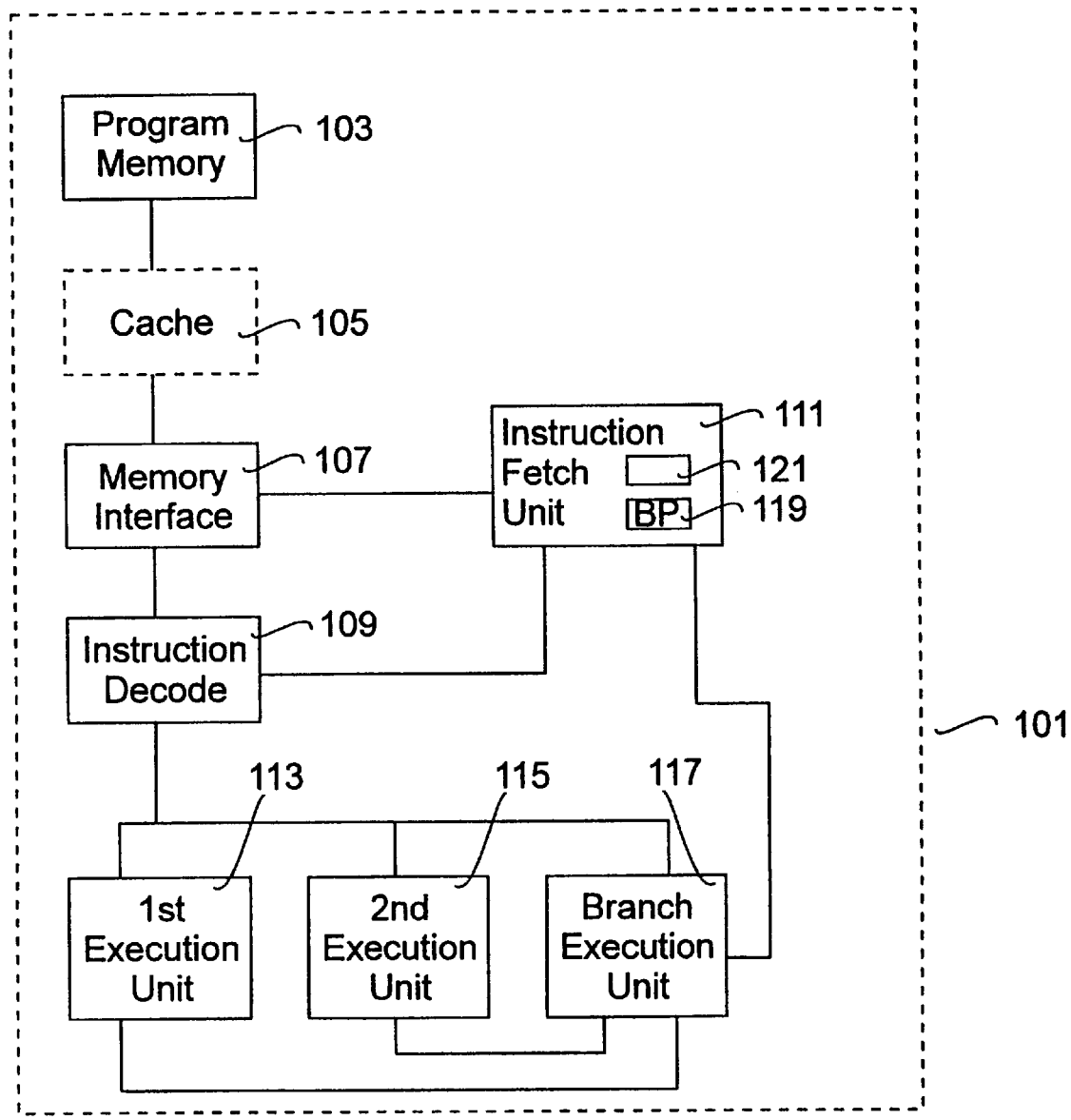
FIG. 1 is a general view of a unit comprising parts of a computer involved in a branch prediction mechanism supplemented with hardware and software for performing semi-static branch prediction.

FIG. 1 illustrates a unit 101 built of a number of blocks which are usually involved in a branch prediction mechanism. Thus, the unit 101 has a program memory 103 in which the program to be executed by the processor is stored. The program memory 103 is usually connected to a cache memory 105. However, the use of the cache memory 105 is optional.

The program memory 103 or the cache memory 105, if such a one is used, is connected to a memory interface 107. The object of the interface 107 is to provide an interface between the memory and an instruction decode block 109. Thus, the block 107 is used for fetching instructions from the memory which then are provided to the instruction decode block 109.

In the instruction decode block 109, the instruction is decoded. When the instruction has been decoded, the processor has knowledge of the type of instruction, which currently is processed. This information is used to evaluate if the instruction is a conditional jump instruction or not. The information if the instruction is a jump instruction or not, is fed to an instruction fetch unit in a block 111 together with information on the address to which the possible jump goes from the block 109. The block 111 also comprises a branch predictor setting means 119.

The information on the address to which the possible jump goes can be fed in various manners such as by means of providing the absolute address directly or as an address relative to the present address, i.e. a relative address. Another way of indicating the address to which a possible jump goes is to provide a parameter. The parameter is then used as an entry to a table which then outputs the address. The latter method is used in the APZ processor developed and manufactured by Ericsson.

The instruction fetch unit in the block 111 then fetches the next instruction based on the information provided from the branch predictor 119. Thus, if the prediction information provided from the branch predictor setting means 119 indicates that the current instruction is a conditional jump instruction, and the jump is decided to be likely to be taken in the block 111, the instruction at the address indicated by the prediction information from the branch predictor setting means 119 is selected to be fetched next.

If, on the other hand, the information from the branch predictor 119 indicates that the current instruction was not a conditional jump instruction, or if the block 111 decides that the jump is not likely to be taken, the instruction at the next sequential instructional address is chosen to be fetched.

The block 111 is also connected to the program memory, and possibly also to the cache memory 105 in order for a unit for collecting statistics 121 located therein to update prediction bits in the memories 103 and 105.

The instruction decoded in the block 109 is then further processed in an execution unit. Usually a processor, as in this case, has several execution units each designed for executing different types of instructions. Hence, the unit 101 is equipped with three execution units 113, 115 and 117. The first unit 113 is used for executing instructions involving integer operations, the second unit 115 is used for executing instructions involving floating point operations and the third execution unit 117, the branch unit, is used for executing jump instructions.

Thus, depending on the type of instruction which is to be executed the decoded instruction from the block 109 is fed to one of the three execution units in blocks 113, 115 or 117.

In the branch execution unit in block 117 information on the outcome of each conditional jump instruction is recorded. This is performed by means of collecting information from the other two execution units in the blocks 113 and 115. When the branch unit in block 117 has collected all information required for evaluating both if a conditional jump was carried out and, if so, to which address the jump went, this information is fed to the block 111. The block 111 uses the feedback information from the block 117 when determining the address from which the next instruction is to be fetched. Thus, if a previous conditional jump has been mispredicted the correct instruction at the correct address must be fetched and instructions fetched from the misprediction and onwards must be ignored.

Figure 2:
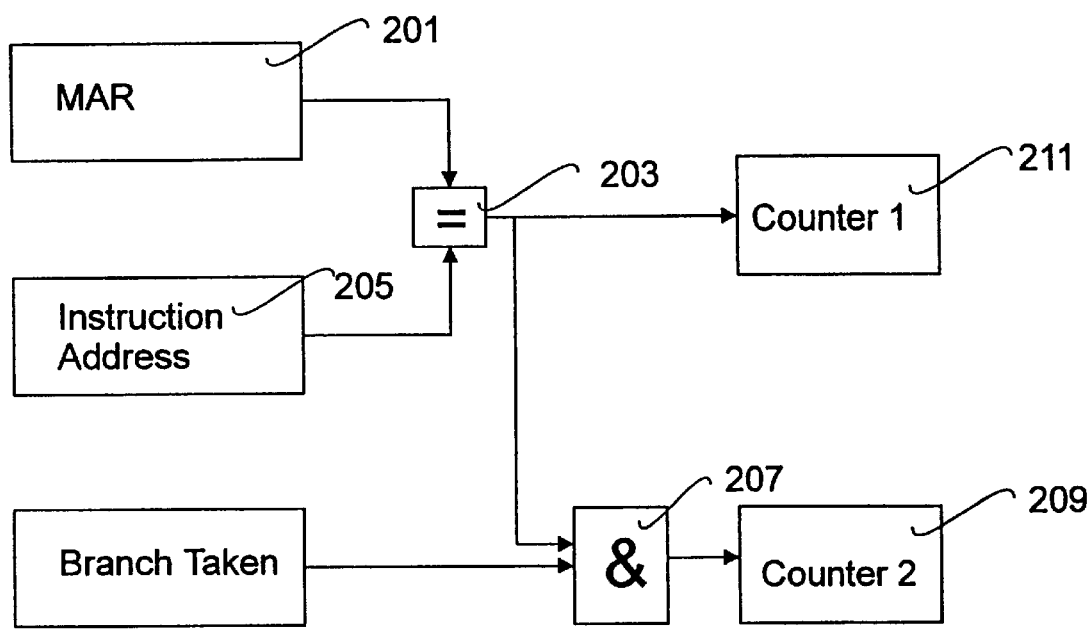
FIG. 2 is a detailed view of the counter hardware used by the unit in FIG. 1.

In FIG. 2 the hardware used in the unit 121 for collecting statistics regarding if a branch is taken or not, is shown. Thus, for collecting statistics regarding a certain conditional branch instruction in the program memory, the address of that instruction is placed in a register 201, here termed Measured Address Register (MAR). This address is compared in a block 203 with the instruction address currently pointed to by the program counter and which is available in a block 205.

The two addresses are compared in the block 203 and if the two addresses are identical a first counter in a block 211 is incremented by one. The output from the block 203 is also fed to an AND block 207. To the AND block 207, a signal indicating if the branch was taken or not is also fed. Thus, the output from the block 207 increments a second counter 209 each time the branch in the instruction in the memory address register is taken.

In general, two out of the following statistics counts needs to be collected for setting the branch prediction bits:

the number of times the conditional branch is taken
the number of times the conditional branch is not taken the total number of times the conditional branch instruction is executed.

Figure 3A:
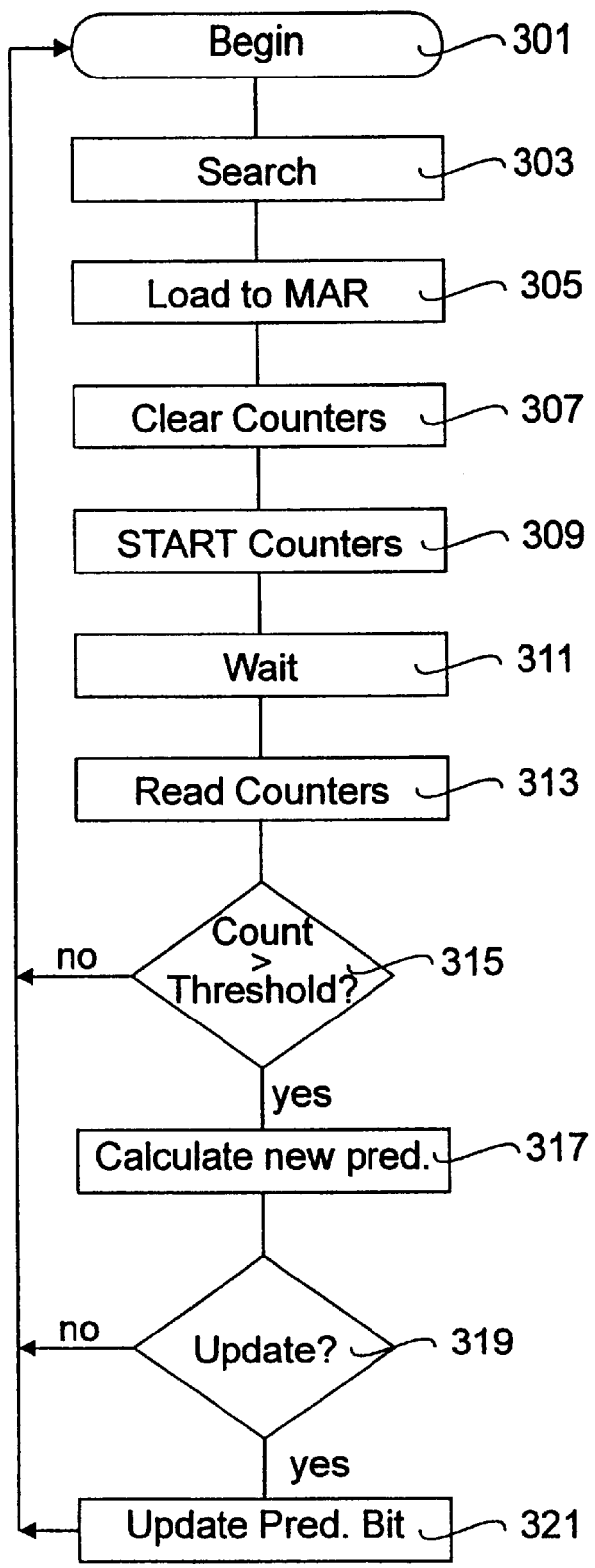
FIGS. 3a and 3b are flow charts used in a background program used for setting a branch prediction bit and for updating a BHT, respectively, in a branch prediction mechanism.
Figure 3B:
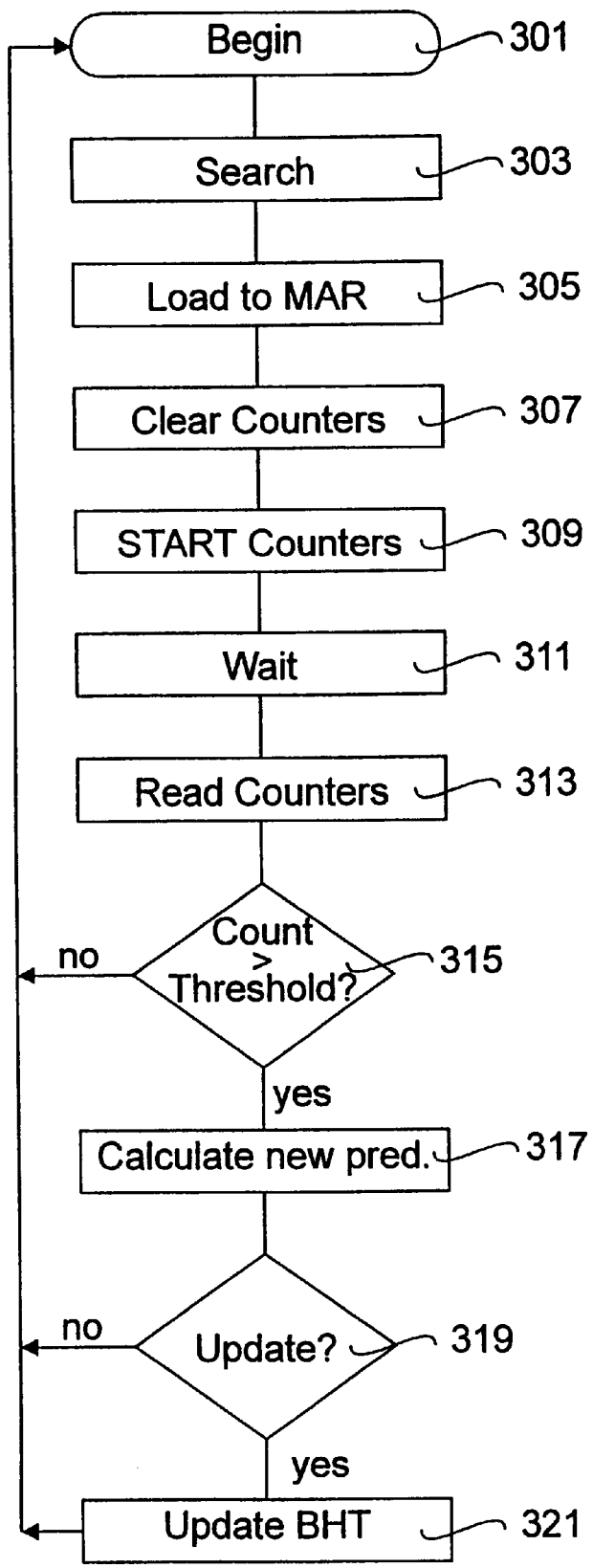

FIGS. 3a and 3b are flow charts illustrating a background program used for collecting statistics regarding different conditional jump instructions and for setting prediction bits accordingly. The counters used by the program are those described in conjunction with FIG. 2.

Thus, the background program begins with scanning or searching the program memory for the first conditional jump instruction in a block 303. When finding the first conditional branch instruction the corresponding program memory address is loaded into the Measured Address Register (MAR) in a block 305. Thereupon the program checks all counters used for collecting the statistics in a block 307.

Next, all counters are started in a block 309. The background program now waits for statistics to be collected. The counters are incremented each time the program from which statistics are collected executes the conditional branch instruction associated with the address stored in the MAR and when the corresponding branch is taken, respectively, if the implementation as described in conjunction with FIG. 2 is used. The statistics for a specific conditional branch instruction are collected for a predefined time as indicated in block 311, which can be equally long for each conditional branch instruction.

Thereafter, the counters are read in a block 313. If the conditional branch instruction was executed very few times during the measurement period the background program returns to the block 303. This is determined in a block 315 for example by means of comparing the number of times the conditional branch instruction was executed to a preset threshold value. If, on the other hand the number of times the conditional branch instruction was executed is large enough for assuring relevant statistics the background program continues to a block 317.

In the block 317, the new prediction is calculated. The background program then proceeds to a block 319. In the block 319, it is decided if the branch prediction bit is to be updated or not.

Thus, if the number of times the conditional branch was taken and not taken, respectively, were equal or almost equal, the decision is no, and the background program returns to the block 303. If, on the other hand, the decision is yes the background program proceeds to a block 321.

In the block 321 the prediction bit in the conditional branch instruction is updated in the program memory and possibly also in the cache memory if used. The background program then returns to the block 303 in which the search for a next conditional branch instructions begins, or if the instruction was the last conditional branch instruction in the memory the background program starts scanning from the beginning of the program in the program memory.

The method can thus be used to either update an extra bit in the instruction memory or a branch prediction bit in the instruction.

In another preferred embodiment the statistics collected by the background program are used for updating a branch history table (BHT). Thus, in such an embodiment, instead of changing a prediction bit in a conditional branch instruction, the background program is used for changing the BHT.

The flow chart for such an implementation can be identical to the flow chart in FIG. 3a except that the block 321 is replaced by a block 323 in which an update of the BHT is performed instead. In FIG. 3b the flow chart for such an implementation is shown.

The use of a system changing a BHT instead of a branch prediction bit in the instructions can be advantageous in cases when a prediction bit is not available in the conditional branch instructions or if the prediction system as described herein is applied in a computer already using a BHT. In the latter case very little extra hardware and software need to be added.

What is claimed is:

1. A system for semi-static prediction, comprising:
   means for scanning a running program for a first conditional branch instruction;
   means for, during a first time interval, recording in a recording means the number of times a specific branch of the first conditional branch instruction in the running program is taken or not taken, respectively;
   means connected to the recording means for setting a branch prediction bit in the instruction, or an extra bit in the instruction memory, to a value depending on the number of times the specific branch in the first conditional branch instruction was taken or not taken during the first time interval; and
   means for scanning the running program for a second conditional branch instruction and starting to record the number of times the second branch is taken or not taken, respectively, during a second time interval after the first time interval has elapsed, so that the system performs semi-static prediction in that the system does not simultaneously monitor all branches in the running program.

2. A system according to claim 1, wherein all time intervals are equally long and preset.

3. A system according to claim 1, wherein the means for setting the branch prediction bit is arranged to set the branch prediction bit in the branch instruction if the branch is taken more times than it is not taken during the time interval and otherwise to reset the branch prediction bit.

4. A system according to claim 1, further comprising means for increasing the time interval for a specific branch instruction, if during a last recording for that specific conditional branch instruction the number of total recorded executed instructions was below a preset threshold value.

5. A system according to claim 1, further comprising means for not changing the branch prediction bit, if at the end of a recording the number of total recorded executed instructions is below a preset threshold value, regardless of the outcome of the collected statistics.

6. A computer comprising:
   a program memory for storing a computer program;
   a decode unit for decoding instructions in the computer program stored in the memory;
   an interface unit connected to the memory, and to the decode unit, for fetching instruction from the memory to the decode unit;
   an execution unit for executing instructions decoded by the decode unit;
   means for sequentially scanning the program running on the computer for conditional branch instructions;
   means connected to the decode unit, to the scanning means and to the execution unit for recording during a first time interval the number of times a specific branch of a first branch instruction found by the scanning means is taken or not taken, respectively;
   means connected to the memory for setting a branch prediction bit in the first instruction, or an extra bit in the instruction memory, to a value corresponding to the number to times the branch in the first branch instruction was taken or not taken during the recording time; and means for recording the number to times a branch of a second branch instruction is taken or not taken during a second time interval after the first time interval has expired, so that semi-state branch prediction is performed for different branches one after the other.

7. A computer according to claim 6, further comprising means for setting the branch prediction bit to indicate that the branch is to be taken, if the number of times the branch is taken during the recording interval exceeds the number of times the branch is not taken and vice versa.

8. A method for branch prediction, comprising the steps of:
scanning a running program for a first conditional branch instruction;
recording during a first time interval the number of times a specific branch of the first conditional branch instruction in the running program is taken or not taken, respectively;
setting a branch prediction bit in the instruction or an extra bit in the instruction memory in the running program to a value depending on the number of times the branch in the instruction was taken or not taken during the recording time; and
performing semi-static branch prediction by repeating said recording and setting steps for different branch instructions in the program one after the other.

9. A method according to claim 8, wherein when a preceding time interval has elapsed, the program is scanned for another conditional branch instruction and a recording during a new time interval is started.

10. A method according to claim 9, wherein all time intervals are set equally long.

11. A method according to claim 8, wherein the branch prediction bit in the conditional branch instruction is set if the branch in the recorded conditional branch instruction is taken more times than it is not taken.

12. A method according to claim 8, wherein if during a last recording for a specific conditional branch instruction the number of total recorded executed instructions was below a preset threshold value, the recording time interval for that specific branch instruction is increased.

13. A method according to claim 8, wherein if at the end of a recording the number of total recorded executed instructions is below a preset threshold value, the branch prediction bit, regardless of the outcome of the collected statistics, is not changed.

14. A system for branch prediction, comprising:
means for scanning a running program for a first conditional branch instruction, and thereafter for a second conditional branch instruction to the exclusion of the first branch instruction;
means for recording during a first time interval the number of times a specific branch of the first conditional branch instruction in a running program is taken or not taken, respectively, and recording during a second time interval after the first time interval the number of times a branch of the second conditional branch instruction is taken or not taken, respectively; and
means connected to the recording means for setting an entry of a branch history table (BHT) corresponding to the address of the recorded instruction to a value depending on the number of time a branch in an instruction was taken or not taken during the recording time.

15. A computer comprising:
a program memory for storing a computer program;
a decode unit for decoding instructions in a computer program stored in the memory;
an interface unit connected to the memory, and to a decoding unit, for fetching instruction from the memory to the decode unit;
an execution unit for executing the instructions decoded by the decode unit;
a branch history table (BHT);
a scanner for scanning a program running on the computer for conditional branch instructions one after another;
a recorder connected to the decode unit, to the scanning means and to the execution unit for recording number of times specific branches of instructions found by the scanner are taken or not taken, respectively, one after another; and
a setting device connected to a branch history table for setting an entry of the branch history table to a value corresponding to the number of times a branch was taken or not taken.

16. A computer according to claim 15, wherein the branch prediction bit is set to indicated that the branch is to be taken, if the number of times the branch is taken in an interval exceeds the number of times the branch is not taken.

17. A method for branch prediction, comprising:
scanning a running program for conditional branch instructions;
recording during different respective time intervals the number of times different respective specific branches of respective conditional branch instructions in the running program are taken or not taken respectively; and
setting an entry in a branch history table corresponding to an instruction to a value corresponding to the number times the branch in the instruction was taken or not taken during a recording time.

18. A method for performing semi-static branch prediction in a running program, the method comprising the steps of:
a) scanning a running program for a first conditional branch instruction;
b) recording during a first time interval a number of times a specific branch of the first conditional branch instruction is taken or not taken, respectively;
c) setting a branch prediction bit for the specific branch of the first conditional branch;
d) scanning the running program for a second conditional branch instruction after performing step a);
e) recording during a second time interval after the first time interval has elapsed, the number of times that a specific branch of the second conditional branch instruction is taken or not taken, respectively;
f) setting a branch prediction bit for the specific branch of the second conditional branch instruction; and
g) repeating steps a) through f).

* * * * *